United States Patent
Chen et al.

(10) Patent No.: US 10,205,642 B2
(45) Date of Patent: *Feb. 12, 2019

(54) SYSTEM AND METHOD FOR MANAGEMENT OF NETWORK MONITORING INFORMATION

(71) Applicant: DELL PRODUCTS L.P., Round Rock, TX (US)

(72) Inventors: YuLing Chen, Fremont, CA (US); David K. Lam, Daly City, CA (US); Bingjun Li, San Jose, CA (US); Weijun Li, Sunnyvale, CA (US); Julie Shur-Meih Hsu, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/951,010

(22) Filed: Nov. 24, 2015

(65) Prior Publication Data

US 2016/0080222 A1    Mar. 17, 2016

Related U.S. Application Data

(63) Continuation of application No. 13/794,143, filed on Mar. 11, 2013, now Pat. No. 9,210,053.

(51) Int. Cl.
*G06F 17/30* (2006.01)
*H04L 12/26* (2006.01)

(52) U.S. Cl.
CPC ........ *H04L 43/04* (2013.01); *G06F 17/30117* (2013.01); *G06F 17/30312* (2013.01);
(Continued)

(58) Field of Classification Search
CPC ......... G06F 17/30693; G06F 17/30283; G06F 17/30117; G06F 17/30812; G06F 17/30477
(Continued)

(56) References Cited

U.S. PATENT DOCUMENTS 6,947,984 B2 * 9/2005 Schweitzer ........... H04M 15/31
                                                                    370/352
7,519,734 B1    4/2009 Dumitriu et al.
(Continued)

OTHER PUBLICATIONS

Alisha cecil; "A Summary of Network Traffic Monitoring and Analysis Techniques"; http://www.cse.wustle.edu/~jain/cse567-06/fp/net_monitoring/index.html; 10 pages; Dec. 2006.*
(Continued)

*Primary Examiner* — Monica M Pyo
(74) *Attorney, Agent, or Firm* — Haynes and Boone, LLP.

(57) ABSTRACT

A system and method for management of network monitoring information includes a non-transient memory and one or more processors coupled to the non-transient memory and configured to read instructions from the non-transient memory to cause the information handling system to perform operations, The operations include collecting real-time network monitoring information from one or more network switching units, storing the collected real-time network monitoring information in a data storage system using a first column family, periodically aggregating the collected real-time network monitoring information to generate corresponding history information, storing the aggregated history information in the data storage system using a second column family different from the first column family, retrieving information from the data storage system based on one or more first queries, the stored real-time network monitoring information, and the stored aggregated history information, and providing the retrieved information for use during network monitoring.

17 Claims, 4 Drawing Sheets

(52) U.S. Cl.
 CPC ...... *G06F 17/30477* (2013.01); *H04L 43/022* (2013.01); *H04L 43/14* (2013.01)

(58) Field of Classification Search
 USPC .................................. 707/736, 737, 748, 749
 See application file for complete search history.

(56) References Cited

U.S. PATENT DOCUMENTS

| | | | |
|---|---|---|---|
| 9,329,975 B2* | 5/2016 | Park | |
| 2004/0054680 A1* | 3/2004 | Kelley | ................. H04L 41/046 |
| 2007/0250625 A1 | 10/2007 | Titus | |
| 2014/0149452 A1* | 5/2014 | Nguyen | ............ G06F 17/30575 707/769 |

OTHER PUBLICATIONS

Chakchai So-In; "A Survey of Network Traffic Monitoring and Analysis Tools"; http://www.cse.wustl.edu/~jain/cse567-06/ftp/net_traffic_monitors3.pdf; 25 pages; Dec. 2006.*

Elsen et al.; "goProbe: A scalable Distributed Network Monitoring Solution"; 2015 IEEE International Coference on Peer-to-Peer Computing, Sep. 21-25, 2015; 12 pages.*

Giura et al., "NetStore: An Efficient Storage Infrastructure for Network Forensics and Monitoring", pp. 277-296, RAID 2010.*

Han et al.: "A Tree-Dimensional Data Model in HBase for Large Time-Series Dataset Analysis", 2012 Crown, 10 pages.

Baranau et al.: "Apache HBase The NoSQL Database for Hadoop and Big Data" cited from http:refcardz.dzone.com/refcardz/hbase#refcard-download-social-buttons-display, dated Jan. 26, 2013, 32 pages.

Juniper: "Real-Time Performance Monitoring on Juniper Networks Devices", 2010, Juniper Networks, Inc., 35 pages.

Wylie et al.: "Using NoSQL Databases for Streaming Network Analysis", Sandia National Laboratories, 4 pages.

Relational DB Inserts Benchmark: http://stackovertlow.com/questions/1517112/30-million-records-a-day-sql-server-cant-keep-up-other-kind-of-database-syste.

Relational DB update Benchmark: http:blogs.lawharvard.edu/philg/2011/01/10/how-many-updates-per-second-can-a-standard-rdbms-process/.

Open TSDB: http://opentsdb.net/overview.html.

* cited by examiner

200

| Row Key | Column Family | Key | Value | Time Stamp |
|---|---|---|---|---|
| Rkey | cf:key=value | | | ts |
| 260 | 270 | | | 280 |

| Row Key | Column Entry | Time Stamp |
|---|---|---|
| <deviceIP>_<ifIndex>_<timestamp> | r:<metricID>=<value><br>450 | <timestamp> |
| <deviceIP>_<ifIndex>_<timestamp> | h:<metricID_aggType>=<value><br>460 | <timestamp> |

SYSTEM AND METHOD FOR MANAGEMENT OF NETWORK MONITORING INFORMATION

CROSS-REFERENCE TO RELATED APPLICATIONS

This application is a continuation of U.S. patent application Ser. No. 13/794,143, filed on Mar. 11, 2013, the full disclosure of which is incorporated by reference herein in its entirety and for all purposes.

FIELD OF THE INVENTION

The present disclosure relates generally to information handling systems, and more particularly to management of network monitoring information.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. In order to recognize and/or adapt to changing conditions in the network, it may be helpful to monitor network activity.

Accordingly, it would be desirable to provide improved systems and methods for managing network monitoring information.

SUMMARY

According to one embodiment, a information handling system includes a data collector configured to collect real-time network monitoring information from one or more network switching units, an aggregator configured to periodically aggregate the collected real-time network monitoring information and generate corresponding history information, a preprocessor configured to periodically determine results for one or more first queries based on the collected real-time network monitoring information and the aggregated history information, a data storage system, and a data retriever configured to retrieve information from the data storage system. The data storage system is configured to store the collected real-time network monitoring information, the aggregated history information, and the preprocessed results of the one or more first queries. The data storage system is further configured to periodically purge the stored real-time monitoring information based on a first time-to-live value and periodically purge the stored history information based on a second time-to-live value. The information is retrieved from the data storage system based on the stored real-time network monitoring information, the stored aggregated history information, the stored preprocessed results of the one or more first queries, the one or more first queries, and one or more second queries different from the one or more first queries.

According to another embodiment, a method of managing network monitoring information includes collecting real-time network monitoring information from one or more network switching units, periodically aggregating the collected real-time network monitoring information and generating corresponding history information, periodically determining results for one or more first queries based on the collected real-time network monitoring information and the aggregated history information, storing the collected real-time network monitoring information, storing the aggregated history information, storing the preprocessed results of the one or more first queries in a data storage system, retrieving information from the data storage system, periodically purging the stored real-time monitoring information based on a first time-to-live value, and periodically purging the stored history information based on a second time-to-live value. The information is retrieved from the data storage system based on the stored real-time network monitoring information, the stored aggregated history information, the stored preprocessed results of the one or more first queries, the one or more first queries, and one or more second queries different from the one or more first queries.

BRIEF DESCRIPTION OF THE DRAWINGS

FIG. 2 is a simplified diagram of a NoSQL schema according to some embodiments.

FIG. 4 is a simplified diagram of NoSQL schema for storing sFlow information according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
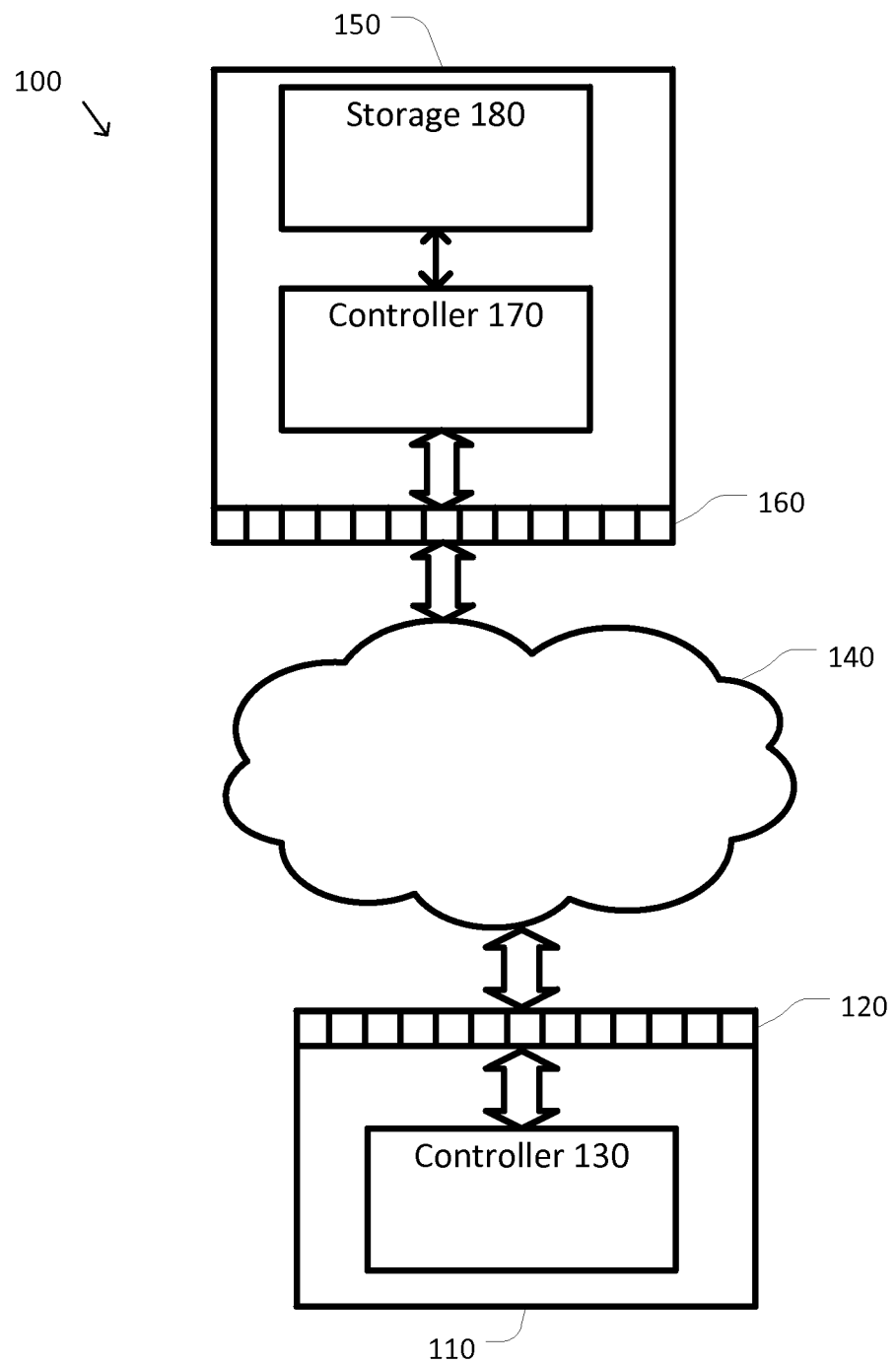
FIG. 1 is a simplified diagram of a network with a network monitoring system according to some embodiments.

FIG. 1 is a simplified diagram of a network 100 with a network monitoring system according to some embodiments. As shown in FIG. 1, network 100 includes one or more network switching devices or switches 110. Each of the one or more switches 110 is coupled to the rest of network 100 using one or more ports 120. Each of the one or more switches 110 further includes a controller 130 that manages and/or controls the operation of the respective switch 110. In some examples, the controller 130 may include one or more processors. Each of the one or more switches 110 may further include memory for storing instructions, data, and/or network traffic. The one or more ports 120 couple each of the one or more switches 110 together using a sub-network 140. In some examples, sub-network 140 may include others of the one or more switches 110, other network devices, and/or network links. Also coupled to sub-network 140 is a data collector 150. In some examples, data collector 150 may be a switch with data collection capabilities. In some examples, data collector 150 may be a stand-alone server. In some examples, data collector 150 may be a distributed system. Data collector 150 includes one or more ports 160 that couple data collector 150 to the sub-network 140. Data collector 150 further includes a controller 170 and storage 180. In some examples, controller 170 may include one or more processors. In some examples, storage 180 may include one or more forms of persistent storage. Some common forms of persistent storage include, for example, floppy disk, flexible disk, hard disk, magnetic tape, any other magnetic medium, CD-ROM, DVD-ROM, any other optical medium, RAM, PROM, EPROM, FLASH-EPROM, any other memory chip or cartridge, and/or any other medium from which a processor or computer is adapted to read from and write data to. In some examples, storage 180 may be distributed across multiple storage devices and/or servers.

According to some embodiments, data collector 150 may use any of numerous network monitoring tools. Merely by way of example, capabilities and features of data collector 150 will be discussed in the context of one such tool, sFlow. In some examples, other network monitoring tools may be substituted for sFlow. sFlow is a tool for monitoring network, wireless, and/or host devices including network switching devices. sFlow may use sampling to achieve scalability of monitoring in high speed networks such as the network 100. In some examples, sFlow may use random sampling of packets in network traffic and/or network flows. In some examples, sFlow may use periodic sampling of counters. In some examples, the counters may count network events and/or network activity. These random and counter samples may be sent to a server, which is often referred to as a sFlow collector. In some examples, the sFlow collector may be the data collector 150. In some examples, the samples may be sent using packets and/or datagrams. During operation, the sFlow collector may constantly receive the sFlow packets, analyze information associated with the sFlow samples included in the sFlow packets, and generate reports based on the information associated with the sFlow samples.

According to some embodiments, sFlow samples may be used to discover interesting network characteristics. In some examples, sFlow may be used to troubleshoot network problems by detecting abnormal traffic patterns and/or controlling network congestion by identifying congested network links. In some examples, sFlow may be used to audit and/or analyze network security by detecting unknown sources in the sFlow samples. In some examples, sFlow may be used to profile routes by detecting the most active routes and specific flows carried by the routes based on forwarding information included in the sFlow samples. In some examples, sFlow may support accounting and billing by determining network usage from the sFlow samples.

According to some embodiments, a significant quantity of data may need to be captured by the sFlow collector despite the use of sampling. In some examples, the quantity of data may require a large amount of resources to capture and analyze the sFlow samples. In some examples, the monitoring and sampling requirements for a single port (such as one of the one or more ports 120) may be large. In some examples, when a single 10 Gbit port with a 70% input and output utilization uses a sampling rate of 512, 25 sFlow packets are generated with each sFlow packet including 1400 bytes. Monitoring of this single port by the sFlow collector requires the collector to capture and analyze 25*1400=35,000 bytes per second. In some examples, when this single port is representative of other ports in a data center, which includes 1000 switches with each switch including 48 ports, a total amount of data includes 25*48*1000=1.2 million samples per second and 25*48*1000*1400 bytes per second, which is over 1.5 Gbytes per second of data. In some examples, the large number of samples and quantity of data may be problematic for most data storage systems, including relational databases.

According to some embodiments, the sFlow samples and corresponding data include several features that may still permit the capture and analysis of sFlow samples for an entire data center. In some examples, the sFlow data may be flat. There are typically no complex relationships between the sFlow data from several sFlow samples, even those sFlow samples from a same switch or port. In some examples, this means that a relational database may not be needed to capture and analyze the sFlow samples. In some examples, the capture and analysis of sFlow data may only require insertion, deletion, and query operations. In some examples, this means that no update operation may be required, thus avoiding overhead associated with transactions in relational databases. According to some embodiments, these features of the sFlow data may make Not Only SQL (NoSQL) a suitable data storage and retrieval option for network monitoring using sFlow.

FIG. 2 is a simplified diagram of a NoSQL schema 200 according to some embodiments. As shown in FIG. 2, the NoSQL schema 200 is based on the storage of key-value pairs as managed objects. In the examples, of FIG. 2, a managed object using the NoSQL schema 200 is associated with five fields. Each managed object is associated with a row key 210, a column family 220, a key 230, a value 240, and a time stamp 250. The row key 210 may be used to uniquely identify each managed object. The column family 220 may be used to group managed objects. By grouping managed objects, NoSQL provides the ability to specify processing of a first column family that is different from the processing for a second column family. The key 230 and value 240 may be used to name and store a data item. The time stamp 250 may be used to record a time associated with the managed object. In some examples, a NoSQL storage system may record the time stamp 250 automatically when the managed object is stored.

In some examples, each managed object using the NoSQL schema 200 may be described using a three-part shorthand. A first part of the shorthand includes the row key 210 as represented by a Rkey 260. A second part of the shorthand includes the column family 220, key 230, and value 240 as represented by a notation of cf:key=value 270. This identifies a value for the key in the column family cf. A third part of the shorthand includes the time stamp as represented by a is 280.

NoSQL has shown some success in applications working with large datasets having flat data and no update operation requirement, including applications working with event recording datasets. However, these applications have been typically limited to batch processing applications that are mining and/or warehousing data. According to some embodiments, additional capabilities may be needed to provide real-time and/or near real-time analysis of network monitoring information.

Figure 3:
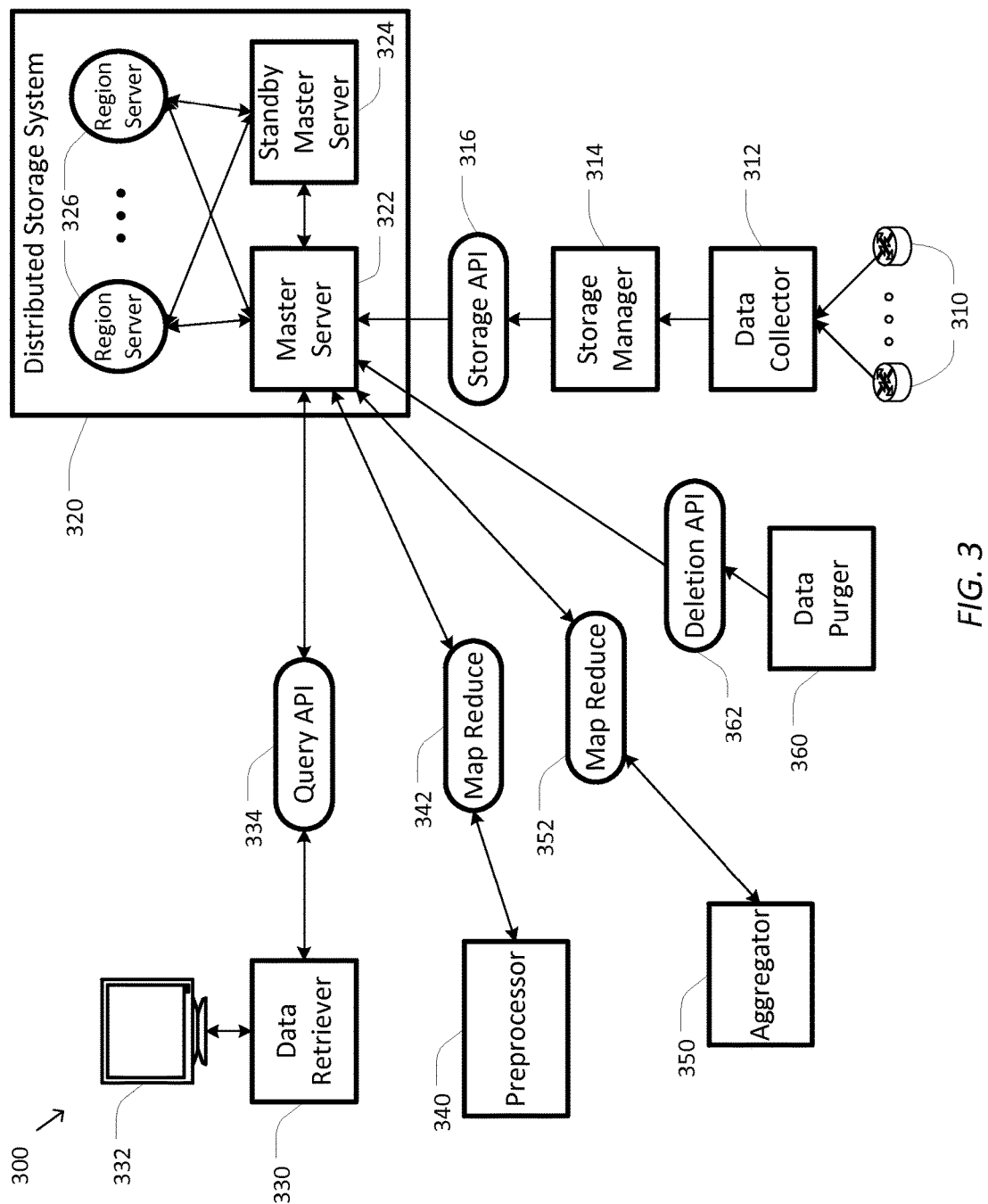
FIG. 3 is a simplified diagram of a network monitoring system according to some embodiments.

FIG. 3 is a simplified diagram of a network monitoring system 300 according to some embodiments. As shown in FIG. 3, the network monitoring system 300 includes one or more network switching devices 310 that are to be monitored. The one or more network switching devices 310 are coupled to a data collector 312 using a network. In some examples, the one or more switches 110 may be representative of the one or more network switching devices 310. In some examples, the data collector 312 may be the data collector 150. Network monitoring information and/or data may be sent from the one or more network switching devices 310 to the data collector 312. In some examples, the network monitoring information may be sFlow samples. Because of the potential for large quantities of network monitoring information, the data collector 312 may be coupled to a storage manager 314 to support persistent storage of the network monitoring information. The data collector 312 provides the network monitoring information to the storage manager 314 for storage. The storage manager 314 may use a storage application programming interface (API) 316 to have the network monitoring information stored in a storage system such as a distributed storage system 320. In some examples, the storage API may be referred to as a persistence API because it is used to place data into persistence storage. In some examples, the storage API 316 may include operations that support insertion of data into a NoSQL database. In some examples, the NoSQL database may be Apache HBase.

The distributed storage system 320 includes a master server 322, a standby master server 324, and one or more region servers 326. In some examples, the distributed storage system 320 may be implemented using a Hadoop Distributed File System (HDFS). In some examples, the master server 322 may be a name node, the standby master server 324 may be a standby name node, and the one or more region servers 326 may each be data nodes. The master server 322 is a primary server for receiving requests to store and/or retrieve data from the distributed storage system 320. The standby master server 324 serves as a backup for the master server 322. In the distributed storage system 320, the master server 322 distributes the storage and retrieval of data to the one or more region servers 326. In some examples, each of the one or more region servers may include persistent storage. Some common forms of persistent storage include, for example, floppy disk, flexible disk, hard disk, magnetic tape, any other magnetic medium, CD-ROM, DVD-ROM, any other optical medium, RAM, PROM, EPROM, FLASH-EPROM, any other memory chip or cartridge, and/or any other medium from which a processor or computer is adapted to read from and write data to. In some examples, use of the storage API to access the master server 322 may result in the master server 322 delegating some or all of storage API operation to the one or more region servers 326.

FIG. 4 is a simplified diagram of NoSQL schema 400 for storing sFlow information according to some embodiments. In some examples, the NoSQL schema 400 may be compatible with Apache HBase. As shown in FIG. 4, the NoSQL schema 400 associates a row key 410, a column entry 420, and a time stamp 430 with each managed object to be stored using the NoSQL schema 400. The row key 410 includes a composite including a deviceIP, an ifindex, and a timestamp as shown by the row keys 440. The deviceIP represents an IP address of the device associated with the corresponding managed object (e.g., one or more of the network switching devices 310). In some examples, the device may be a network switching device. The ifIndex represents a subcomponent of the device. In some examples, the subcomponent may be a port. In some examples, when the managed object is associated with an entire network switching device, the ifIndex may be −1. The timestamp is associated with a time at which the managed object was sampled.

The column entry 420 is a composite of a column family, a key, and a value for the managed object. In some examples, the column entry 420 may be analogous to the shorthand 270. In the NoSQL schema 400, managed objects may belong to one of two column families. A real-time column family (abbreviated "r") is associated with real-time metrics associated with sFlow samples as shown by a representative real-time column entry 450. A history column family (abbreviated "h") is associated with aggregated metrics based on multiple sFlow samples as shown by a representative history column entry 460. The real-time column entry 450 includes the "r" designation for the real-time column family as well as a metricID and a value. The metricID identifies the metric that is associated with the real-time column entry 450 and the value is the value of the metric. In some examples, a source IP address from a sample packet may be recorded as "r:IpSrc=1.2.3.4" and a TCP source port number as "r:TcpSrc=8080".

The history column entry 460 includes the "h" designation for the history column family as well as a metricID, an aggType, and a value. The metricID identifies the metric that is associated with the history column entry 460, the aggType identifies a type of aggregation, and the value is an aggregated value of the metric. In some examples, the type of aggregation may include Min, Max, Average, Count, Sum, and the like. In some examples, the Min, Max, and Average aggregation types may be used with interface metrics, such as ifInErrors, ifOutErrors, ifinOctets, and ifOutOctets. In some examples, when real-time metrics from the real-time column family are aggregated over a time period, aggregations using the Min, Max, and Average operations may be computed over the time period. In some examples, the time period may be any reasonable time period including 1 minute, 5 minutes, 10 minutes, 15 minutes, 30 minutes, and the like. In some examples, aggregations for the ifInOctets metric may be recorded as "h:ifInOctets_MIN=0", "h:ifInOctets_MAX=50", and "h:ifInOctets_AVG=22". In some examples, the Count aggregation type may be used to count occurences. In some examples, aggregations for "IpSrc" and "TcpSrc" may be recorded as "h:IpSrc_1.2.3.4_CNT=1357" and "h:TcpSrc_8080_CNT=68", respectively, to record 1357 occurrences of the IP source address 1.2.3.4 and 68 occurrences of the TCP port 8080 during the aggregation time period.

According to some embodiments, use of the NoSQL schema 400 may provide several advantages. In some examples, the row key 410 may be used by the distributed storage system 320 to select a region server from among the one or more region servers 326 to store the managed object. In some examples, using the deviceIp and ifIndex in the leading position of the row key 410 may result in more even distribution of the sFlow information across the one or more region servers 326. In some examples, a short column family (e.g., "r" and "h") and/or key (e.g., "TcpSrc") may speed up indexing of the managed objects during data insertion. In some examples, a short column family and/or key may also facilitate efficient retrieval of the managed objects. In some examples, separating real time sFlow information from aggregated history sFlow information into separate column families (e.g., real-time and history) may support a more flexible data retention policy as the separate column families may be managed separately. In some examples, the separate column families may improve retrieval time by separating real-time information from aggregated history information.

Referring back to FIG. 3, the network monitoring system 300 further includes a data retriever 330 for retrieving data from the distributed storage system 320. In some examples, the data retriever 330 may be coupled to a computer and/or terminal 332 to allow a user to request retrieval of data from the distributed storage system 320 and to view the retrieved data. In some examples, the computer 332 may include a graphical user interface (GUI) that allows the user to select and/or create queries and/or reports. The data retriever 330 may access the data in the distributed storage system using a query API 334. In some examples, the data retriever 330 and the query API 334 may provide support for both static and dynamic queries.

In some examples, static queries may include commonly used queries that are known and/or anticipated when the data retriever 330 is developed. In some examples, the static queries may be built into the data retriever 330. In addition, because the static queries are known in advance, a preprocessor 340 may be used to pre-compute results of the static queries before the static queries are requested. In some examples, the user may often be interested in the real-time and historical throughput for ports of various switches. In some examples, the user may want a daily report of the top 10 TCP port occurrences over the previous 24 hours. In some examples, when a static query is requested, the data retriever 330 and the query API 334 may retrieve some or all results of the static query directly from a pre-computed query results stored in the distributed storage system 320.

In some examples, dynamic queries may include queries that are not known until run-time. In some examples, the user may create the queries using the GUI. In some examples, a dynamic query might include a request for the top 25 TCP port occurrences in the past 21 days. In some examples, the dynamic queries may be sent to the distributed storage system 320 using the query API 334. In some examples, the query API 334 may include a filter API that can match managed objects stored in the distributed storage system 320 to a dynamic query. In some examples, the distributed storage system 320 and/or the query API 334 may provide enhancements that use the distributed nature of the distributed storage system 320 to improve a response time of dynamic queries. In some examples, a series of inter-related stored procedures, dynamic remote procedure call (RPC) extensions, and/or endpoints may be deployed on the master server 322, the standby master server 324, and/or the one or more region servers 326. When a query is sent to the master server 322, the master server may distribute processing for the query to each of the one or more region servers 326. In some examples, endpoints may be deployed on the master server 322, the standby master server 324, and/or the one or more region servers 326 that count the number of instances of a particular filter pattern (e.g., getCount(Filter filter)). Each of the one or more region servers 326 may include a first version of getCount that simply counts a number of matching instances in the managed objects stored in the corresponding region server and return the count. The master server 322 and the standby master server 324 may include a second version of getCount that triggers getCount in all of the one or more region servers 326 and then computes a total of all the returned results. In some examples, the distributed processing of the query may be supported by the Apache HBase EndPoint and Co-processor APIs.

According to some embodiments, the data retriever 330 may support queries related to automated network monitoring. In some examples, the supported network monitoring may include detecting abnormal traffic patterns, controlling network congestion, analyzing network security, profiling routes, supporting billing and accounting, and the like. In some examples, the automated network monitoring queries may be triggered periodically based on a timer.

The preprocessor 340 may use a map reduce interface 342 to periodically pre-compute the results of static queries. In some examples, the preprocessor 340 may be triggered using a periodic timer. In some examples, the preprocessor 340 may access the distributed storage system 320 when the distributed storage system 320 is under-utilized and/or idle. In some examples, to support the top 10 TCP source port occurrences in the previous 24 hours static query, the preprocessor 340 using the map reduce interface 342 may periodically scan the real-time and/or history column families to obtain corresponding managed objects, compute the results of the query, and store the results into a corresponding results table in the distributed storage system 320. When the data retriever later executes the static query, the query API 334 may be used to retrieve the results of the query from the corresponding results table.

The network monitoring system 300 further includes an aggregator 350. The aggregator 350 may use a map reduce interface 352 to periodically aggregate real-time data in the real-time column family into the history column family and stored in the distributed storage system 320. In some examples, the aggregator 350 may be triggered using a periodic timer. In some examples, the aggregator 350 may access the distributed storage system 320 when the distributed storage system 320 is under-utilized and/or idle. In some examples, the periodic timer may trigger aggregation of the real-time data using any reasonable aggregation period including 1 minute, 5 minutes, 10 minutes, 15 minutes, 30 minutes, and the like. In some examples, the aggregator 350 may improve responsiveness to queries in a fashion similar to the preprocessor 340. By periodically computing the aggregations, queries may access the aggregations in the history column family faster than the aggregations could be recomputed at the time of the respective queries by using only real-time managed objects which are much larger in number. In some examples, use of the aggregator 350 may provide other efficiencies to the network monitoring system 300. In some examples, real-time information may only be needed for a short period of time. As the real-time information ages, its direct usefulness may be reduced and may be replaced by the aggregated information in the history column family. Thus, periodic use of the aggregator 350 may support purging of any real-time information older than the most recent data aggregation period. In some examples, the data aggregation period may be any reasonable aggregation period including 1 minute, 5 minutes, 10 minutes, 15 minutes, 30 minutes, and the like.

The network monitoring system 300 further includes a data purger 360. The data purger 360 may use a deletion API 362 to periodically remove unwanted and/or unneeded managed objects stored in the distributed storage system 320. In some examples, purging of the sFlow information may be achieved by using the deletion API 362 to set a time-to-live (TTL) value for each column family. Any managed objects with a time stamp older than the corresponding TTL value before the present may be purged. In some examples, because the real-time information is aggregated for each aggregation period, the TTL value for the real-time column family may be set to the aggregation period or slightly longer. In some examples, when the aggregation period is 15 minutes, the TTL value for the real-time column family may be set to 15 minutes. In some examples, when the real-time information must be retained longer (e.g., for auditing), the TTL value for the real-time column family may be changed using the data purger 360. In some examples, the purging of the real-time information may help limit a total amount of data that needs to be stored by the distributed storage system 320. In some examples, the TTL value for the history column family may be longer than the TTL value for the real-time column family. In some examples, the TTL value for the history column family may be one month, six months, one year, and/or the like.

Figure 5:
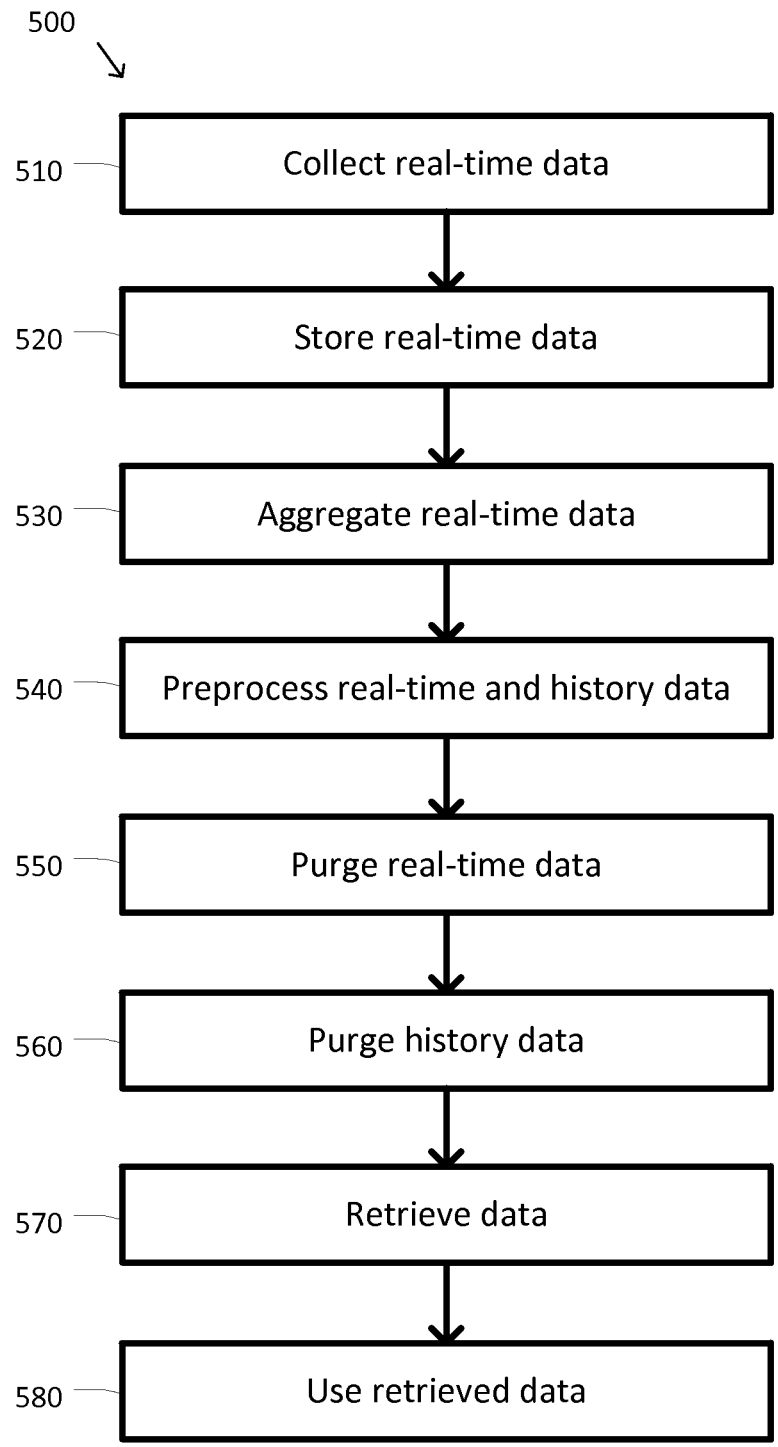
FIG. 5 is a simplified diagram showing a method of management of network monitoring information according to some embodiments.

FIG. 5 is a simplified diagram showing a method 500 of management of network monitoring information according to some embodiments. As shown in FIG. 5, the method 500 includes a process 510 for collecting real-time data, a process 520 for storing real-time data, a process 530 for aggregating real-time data, a process 540 for preprocessing real-time and history data, a process 550 for purging real-time data, a process 560 for purging history data, a process 570 for retrieving data, and a process 580 for using the retrieved data. According to certain embodiments, the method 500 of management of network monitoring information can be performed using variations among the processes 510-580 as would be recognized by one of ordinary skill in the art. In some embodiments, one or more of the process 510-580 may be performed in parallel. In some embodiments, one or more of the processes 510-580 may be performed periodically based on timers and/or status of one or more processors. In some embodiments, one or more of the processes 510-580 may be performed on demand. In some embodiments, one or more of the processes 510-580 of method 500 may be implemented, at least in part, in the form of executable code stored on non-transient, tangible, machine readable media that when run by one or more processors (e.g., one or more processors in the data collector 150 and/or one or more processors associated with the data collector 312, the storage manager 314, the distributed storage system 320, the data retriever 330, the computer 332, the preprocessor 340, the aggregator 350, and/or the data purger 360) may cause the one or more processors to perform one or more of the processes 510-580.

At the process 510, real-time data is collected. In some examples, the real-time data may be associated with network status of network switching devices, network devices, network links, and the like. In some examples, the real-time data may be sampled data. In some examples, the real-time data may be sFlow information. In some examples, the real-time data may be collected from one or more network switching devices (e.g., the one or more network switching devices 310). In some examples, the real-time data may be collected by the data collector 312 and/or the storage manager 314.

At the process 520, the real-time data is stored. Once the real-time data is collected during the process 510, the real-time data is stored. In some examples, the processes 510 and 520 may occur continuously as the real-time data is constantly collected and stored. In some examples, the real time data may be stored using a distributed storage system (e.g., the distributed storage system 320). In some examples, the distributed storage system uses HDFS. In some examples, the real-time data may be stored using a NoSQL-based database. In some examples, the NoSQL-based database may be Apache HBase. In some examples, the real-time data may be stored into a real-time column family using the NoSQL schema 400.

At the process 530, the real-time data is aggregated. In some examples, the real-time data may be aggregated into history data. In some examples, the process 530 may be performed, at least in part, by the aggregator 350. In some examples, the aggregated real-time data may be stored in a history column family in the distributed storage system. In some examples, aggregations may be based on aggregation types including Min, Max, Average, Count, Sum, and the like. In some examples, the process 530 may be triggered using a periodic timer. In some examples, the process 530 may be performed during under-utilized and/or idle time. In some examples, the periodic timer may trigger aggregation of the real-time data using any reasonable aggregation period including 1 minute, 5 minutes, 10 minutes, 15 minutes, 30 minutes, and the like.

At the process 540, real-time and history data are preprocessed. In some examples, the preprocessed real-time and history data may support static queries by pre-computing the results of corresponding static queries. In some examples, results from preprocessing the real-time and history data may be stored in the distributed storage system for later retrieval. In some examples, the process 540 may be performed, at least in part, by the preprocessor 340. In some examples, the process 540 may be triggered using a periodic timer. In some examples, the process 540 may be performed during under-utilized and/or idle time.

At the process 550, real-time data is purged. The real-time data may be purged when it is no longer needed to support network monitoring. In some examples, the real-time data may be purged based on a real-time TTL value associated with the real-time data. In some examples, the real-time TTL value may be associated with the real-time column family. In some examples, any real-time data having a time stamp older than the corresponding real-time TTL value before the present may be purged. In some examples, the real-time TTL value may be set, at least in part, using the data purger 360. In some examples, the real-time TTL value may be approximately equal to the aggregation period associated with the process 530. In some examples, the process 550 may be triggered periodically. In some examples, the process 550 may be performed during under-utilized and/or idle time.

At the process 560, history data is purged. The history may be purged when it is no longer needed to support network monitoring. In some examples, the history data may be purged based on a history TTL value associated with the history data. In some examples, the history TTL value is associated with the history column family. In some examples, any history data having a time stamp older than the corresponding history TTL value before the present may be purged. In some examples, the history TTL value may be set, at least in part, using the data purger 360. In some examples, the history TTL value may be one month, six months, one year, and/or the like. In some examples, the process 560 may be triggered periodically. In some examples, the process 560 may be performed during under-utilized and/or idle time.

At the process 570, data is retrieved. In some examples, data may be retrieved from the real-time data, the history data, the stored results from the preprocessing performed during the process 540, and/or combinations thereof. In some examples, data may be retrieved to support queries and/or reports. In some examples, the queries may include static queries and dynamic queries. In some examples, the static queries may use the stored results from the preprocessing performed during the process 540. In some examples, the data may be retrieved using distributed processing. In some examples, the queries may be specified by a user. In some examples, the process 570 may be performed, at least in part, by the data retriever 330.

At the process 580, the retrieved data is used. The data retrieved during the process 570 may be used to support network monitoring. In some examples, the supported network monitoring may include detecting abnormal traffic patterns, controlling network congestion, analyzing network security, profiling routes, supporting billing and accounting, and the like. In some examples, the data may be displayed to the user using the computer and/or terminal 332.

Some embodiments of the data collector 150, the data collector 312, the storage manager 314, the distributed storage system 320, the data retriever 330, the computer 332, the preprocessor 340, the aggregator 350, and/or the data purger 360 may include non-transient, tangible, machine readable media that include executable code that when run by one or more processors may cause the one or more processors to perform the processes of method 500 as described above. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An information handling system comprising:
a non-transient memory; and
one or more processors coupled to the non-transient memory and configured to read instructions from the non-transient memory to cause the information handling system to perform operations comprising:
collecting real-time network monitoring information from one or more network switching units;
storing the collected real-time network monitoring information in a data storage system using a first column family;
periodically aggregating the collected real-time network monitoring information to generate corresponding history information;
storing the aggregated history information in the data storage system using a second column family different from the first column family;
receiving a network monitoring query;
retrieving, in response to receiving the network monitoring query, information from the data storage system based on the network monitoring query, the stored real-time network monitoring information, and the stored aggregated history information;
providing the retrieved information as a response to the network monitoring query;
periodically deleting portions of the stored real-time network monitoring information older than a first time-to-live value; and
periodically deleting portions of the stored aggregated history information that is older than a second time-to live value longer than the first time-to-live value.

2. The information handling system of claim 1, wherein the data storage system stores the stored real-time information and the stored aggregated history information using a NoSQL schema.

3. The information handling system of claim 1, wherein the data storage system is a distributed data storage system.

4. The information handling system of claim 1, wherein the real-time network monitoring information is sFlow information.

5. The information handling system of claim 1, wherein the operations further comprise:
    periodically processing one or more commonly used static queries; and
    storing results of the one or more commonly used static queries in the data storage system.

6. The information handling system of claim 5, wherein retrieving the information from the data storage system is further based on the stored results of the one or more commonly used static queries.

7. A method of managing network monitoring information, the method comprising:
    collecting, using a network monitoring system comprising a non-transient memory and one or more processors executing instructions stored in the non-transient memory, real-time network monitoring information from one or more network switching units;
    storing the collected real-time network monitoring information in a data storage system using a first column family;
    periodically aggregating, by the network monitoring system, the collected real-time network monitoring information to generate corresponding history information;
    storing the aggregated history information in the data storage system using a second column family different from the first column family;
    receiving a network monitoring query;
    retrieving, in response to receiving the network monitoring query, information from the data storage system based on the network monitoring query, the stored real-time network monitoring information, and the stored aggregated history information;
    providing the retrieved information as a response to the network monitoring query;
    periodically deleting portions of the stored real-time network monitoring information older than a first time-to-live value; and
    periodically deleting portions of the stored aggregated history information that is older than a second time-to live value longer than the first time-to-live value.

8. The method of claim 7, wherein the data storage system stores the stored real-time information and the stored aggregated history information using a NoSQL schema.

9. The method of claim 7, wherein the data storage system is a distributed data storage system.

10. The method of claim 7, wherein the real-time network monitoring information is sFlow information.

11. The method of claim 7, further comprising:
    periodically executing one or more commonly used static queries; and
    storing results of the one or more commonly used static queries in the data storage system.

12. The method of claim 11, wherein retrieving the information from the data storage system is further based on the stored results of the one or more commonly used static queries.

13. A non-transient computer-readable media having stored thereon machine-readable instructions executable to cause an information handling system to perform operations comprising:
    collecting real-time network monitoring information from one or more network switching units;
    storing the collected real-time network monitoring information in a data storage system using a first column family;
    periodically aggregating the collected real-time network monitoring information to generate corresponding history information;
    storing the aggregated history information in the data storage system using a second column family different from the first column family;
    receiving a network monitoring query;
    retrieving, in response to receiving the network monitoring query, information from the data storage system based on the network monitoring query, the stored real-time network monitoring information, and the stored aggregated history information;
    providing the retrieved information as a response to the network monitoring query;
    periodically deleting portions of the stored real-time network monitoring information older than a first time-to-live value; and
    periodically deleting portions of the stored aggregated history information that is older than a second time-to live value longer than the first time-to-live value.

14. The non-transient computer-readable media of claim 13, wherein the data storage system stores the stored real-time information and the stored aggregated history information using a NoSQL schema.

15. The non-transient computer-readable media of claim 13, wherein the data storage system is a distributed data storage system.

16. The non-transient computer-readable media of claim 13, wherein the real-time network monitoring information is sFlow information.

17. The non-transient computer-readable media of claim 13, wherein the operations further comprise:
    periodically processing one or more commonly used static queries; and
    storing results of the one or more commonly used static queries in the data storage system; and
    retrieving the information from the data storage system is further based on the stored results of the one or more commonly used static queries.

* * * * *